May 17, 1960 W. P. MASON 2,936,612
AVOIDANCE OF FATIGUE EFFECTS UNDER DYNAMIC STRAIN
Filed Jan. 11, 1956 4 Sheets-Sheet 1
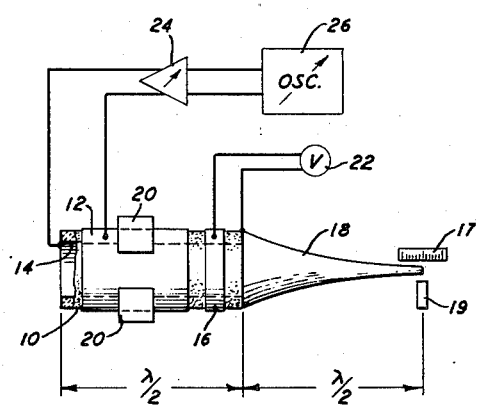
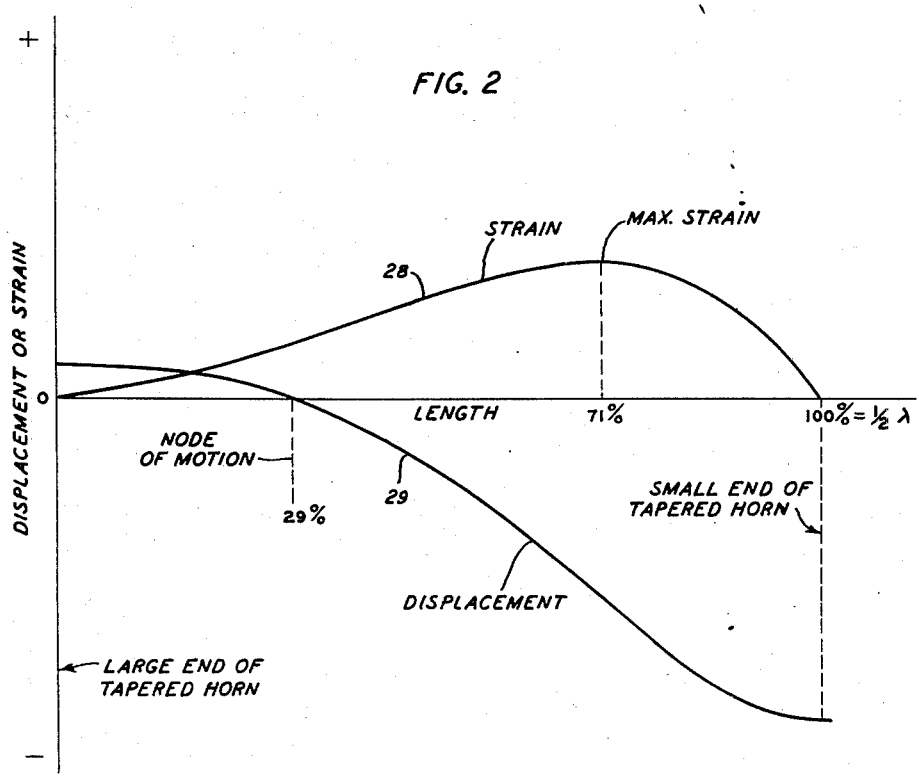
INVENTOR
W. P. MASON
BY
H. O. Wright
ATTORNEY May 17, 1960 W. P. MASON 2,936,612
AVOIDANCE OF FATIGUE EFFECTS UNDER DYNAMIC STRAIN
Filed Jan. 11, 1956 4 Sheets-Sheet 2
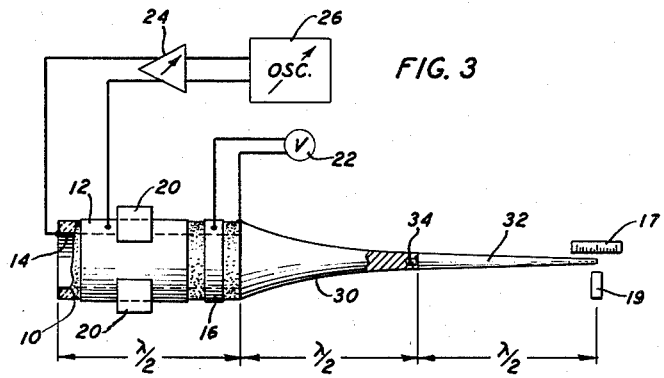
FIG. 3
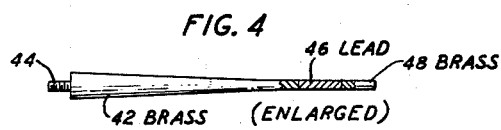
FIG. 4 (ENLARGED)
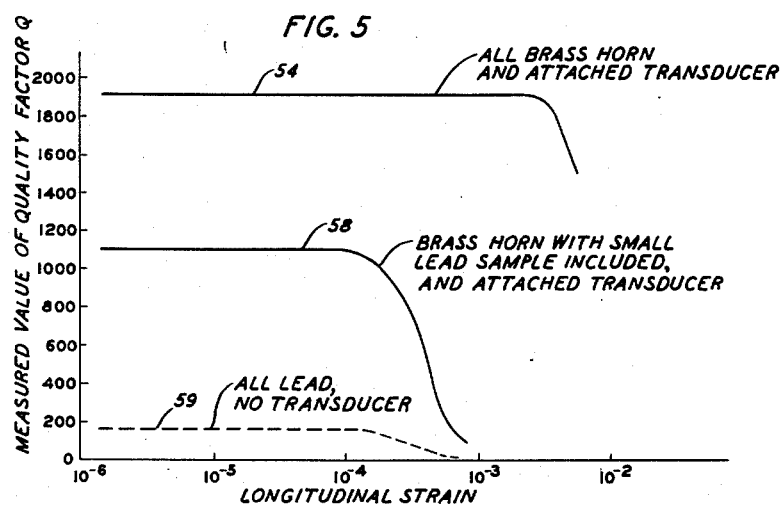
FIG. 5
INVENTOR
W. P. MASON
BY
H. O. Wright
ATTORNEY May 17, 1960 W. P. MASON 2,936,612
AVOIDANCE OF FATIGUE EFFECTS UNDER DYNAMIC STRAIN
Filed Jan. 11, 1956 4 Sheets-Sheet 4

INVENTOR
W. P. MASON
BY
H. O. Wright
ATTORNEY

2,936,612

AVOIDANCE OF FATIGUE EFFECTS UNDER DYNAMIC STRAIN

Warren P. Mason, West Orange, N.J., assignor to Bell Telephone Laboratories, Incorporated, New York, N.Y., a corporation of New York Application January 11, 1956, Serial No. 558,558

5 Claims. (Cl. 73—67.3)

This invention relates to apparatus for determining the properties of materials under conditions of high dynamic strain. In a particular aspect of the invention it relates to apparatus for determining the degree or amplitude of dynamic strain structural elements of any particular material are capable of withstanding without encountering fatigue effects which quickly impair the properties of the material and result in untimely mechanical failure of the element. In a further aspect, it relates to apparatus for determining the behavior of materials under the combination of static and dynamic strains.

Fatigue effects in structural materials under dynamic strains have been the subject of diligent study and research for several decades but heretofore the nature and causes of such fatigue effects and the correlations between significant properties of the materials involved and the incidence of fatigue effects have, to an appreciable degree, remained shrouded in uncertainty and conjecture. No satisfactory general method of determining the degree or amplitude of high dynamic strain that a specific material will withstand without developing fatigue effects has heretofore been devised.

By way of example, reference may be made to the book entitled "Fatigue of Metals and Structures" by H. J. Grover, S. A. Gordon and L. R. Jackson of the Battelle Memorial Institute, 1954, prepared for the Bureau of Aeronautics of the Navy Department and available at the United States Government Printing Office under the designation NAVAER 00–25–534. Quoting from the preface of this book, "Over the past half century, there has been increasing recognition of the importance of designing structures and machine parts to avoid fatigue failures under repeated stressing. This has been a particular concern in the aircraft industry where gusts, vibration, and other sources of repeated stress are unavoidable and yet there is a necessity for optimum design."; ". . . it is recognized that in a number of instances present-day knowledge is incomplete, hence the information presented here can only be considered as a guide and a starting point toward adequate solution of specific problems."

Quoting further from page 16 of the above-noted book, "Considerable effort has been expended in attempts to correlate fatigue strengths of metals with other engineering properties, such as: static tensile strength, static yield strength, proportional limit, internal friction, notch impact strength, creep-rupture strength, and so on. For some materials, there appears to be a measure of correlation between fatigue strength and static tensile strength (see ch. XI). For the most part, however, attempts at finding correlations between fatigue strength and other engineering properties have been unsuccessful."

In the present state of the art, therefore, it is not unusual to hear of test models of aircraft, costing hundreds of thousands of dollars, being constructed only to have vital portions thereof shattered by fatigue effects during the initial test flights.

A pressing problem confronting those concerned with the design of sheathed aerial cables, particularly cables enclosing large numbers of pairs of insulated conductors for use in communication circuits, is the avoidance of fatigue effects in the sheathing material. This material is commonly lead. For this reason the performance of lead under dynamic strain is of substantial interest, though lead is not ordinarily employed in structures subjected to appreciable dynamic strains.

In accordance with the present invention, and in conjunction with a comprehensive study of dislocation effects in materials, such as the so-called Frank-Read dislocation loops (see, for example, the book entitled, "Dislocations in Crystals" by W. T. Read, Jr., published by McGraw-Hill Publishing Co. New York 1933), applicant has discovered that if a small sample of a material to be tested is subjected to a dynamic strain, the amplitude of which can be raised in controllable moderate increments to, or nearly approaching, that value at which failure by rupture occurs, and the "quality factor Q" (ratio of "mechanical reactance" to "mechanical resistance" or "energy dissipation") of the material is measured at each increment of dynamic strain, the "quality factor Q" will remain substantially the same as its value for low dynamic strain amplitudes until a particular value of dynamic strain amplitude is reached. If the dynamic strain amplitude is increased beyond this particular value, the "quality factor Q" of the material will begin to decrease slowly but perceptibly, indicating the existence of a region in which there is a phenomenon akin to "creep" in static tensile tests. As the dynamic strain amplitude is further increased, a second value of strain is reached for which the "quality factor Q" will begin to decrease sharply. Upon further increase in amplitude, the "quality factor Q" will rapidly fall to a small fraction of its original low dynamic strain value as it approaches the amplitude value of dynamic strain at which failure by rupture quickly occurs. In general, for materials having a high quality factor Q, the effects of "creep" may be relatively very small and the strain amplitude at which the sharp decrease in quality factor Q commences will be relatively much higher than for materials having a low quality factor Q.

For a discussion of the "quality factor Q" and the conventional methods of measuring it, reference may be had to chapter XV starting at page 390 of applicant's book entitled, "Piezoelectric Crystals and Their Application to Ultrasonics," D. Van Nostrand Co., New York city 1950.

Further, in accordance with the present invention, if an element of any specific material is subjected only to dynamic strains of lesser amplitude than that at which the above-mentioned rapid diminution in the "quality factor Q" can be observed to commence, then fatigue effects resulting solely from the dynamic strain to which the element is subjected are not at all likely to be encountered. It should, of course, be recognized that other factors such as injuries sustained in machining processes, sharply defined discontinuities in contour effected by machining processes, flaws introduced during manufacture, and the like, must also be taken into consideration as possible causes from which fatigue effects may result.

For a number of practical testing purposes, it will ordinarily not be necessary to actually determine the "quality factor Q" of the material, but it will suffice, as will presently become apparent, to determine changes in a related characteristic of the material such as the physical deformation of the testing sample of the material under consideration with variation of applied dynamic strain.

Apparatus for readily determining the behavior of materials under a combination of static and dynamic strains will also be described in detail in the following specification and illustrated in the accompanying drawings.

Accordingly, it is a principal object of the invention to facilitate the design of structures to withstand dynamic strain which structures will not be subject to untimely mechanical failure resulting from fatigue effects in the material from which they are manufactured.

A further object is to afford a criterion whereby the maximum permissible dynamic strain amplitude for fault-free operation over a long period of service of a structural element of any specific material can be determined.

A still further object is the provision of apparatus for determining the properties of materials under high amplitude dynamic strains.

Still another object is to provide a convenient means for readily determining the behavior of materials under a combination of static and dynamic strains.

Other and further objects, features and advantages of the invention will become apparent from the following detailed description of specific illustrative arrangements for practising the principles of the invention as well as from the appended claims.

In the accompanying drawings:

Fig. 1 illustrates one arrangement of apparatus for practising particular principles of the present invention;

Fig. 2 illustrates the distribution along the exponentially tapered rod or horn of Fig. 1 of the strain and displacement for dynamic strain tests of the invention;

Fig. 3 illustrates a second arrangement of apparatus for practising certain principles of the invention adapted particularly for the convenient testing of various materials, including those having a low quality factor Q;

Fig. 4 illustrates the structure of a tapered horn or rod composed mainly of brass or other high quality factor Q material with a small section of low quality factor Q material included near the small end of the horn or rod;

Fig. 5 illustrates, respectively, by the three curves of the figure, the variation of the quality factor Q with longitudinal dynamic strain amplitude for an all-brass tapered horn with an attached barium titanate transducer, for a tapered brass horn in which a small lead sample has been included with an attached transducer, and for an all-lead sample without an attached transducer;

Figure 6:
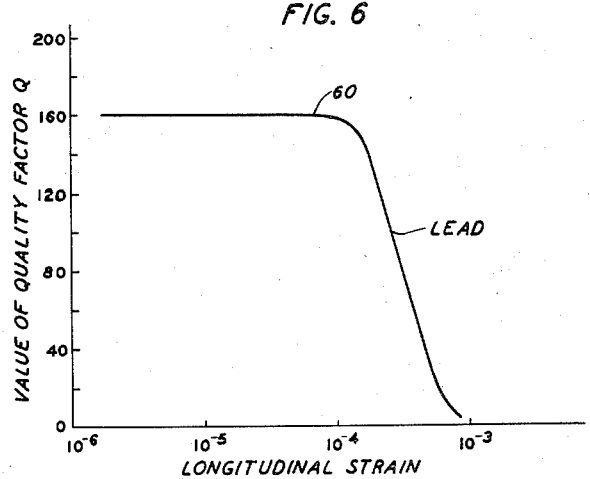
Fig. 6 illustrates, to a more readily legible scale, the variation of the quality factor Q with longitudinal dynamic strain amplitude, for lead.

In more detail, Fig. 1 illustrates a specific arrangement in accordance with the principles of the invention for measuring the quality factor Q of a material and for observing a parameter of the material which varies in direct proportion with changes in the factor Q as the longitudinal dynamic strain on the test member is increased.

The arrangements illustrated in Figs. 1 and 3 of the accompanying drawings are obviously closely related to arrangements disclosed and claimed in applicant's Patent 2,514,080 granted July 4, 1950, see particularly Fig. 2 of said patent, and in Patent 2,573,168 granted October 30, 1951 to applicant and R. F. Wick jointly. Much of the fundamental theory underlying the operation of the arrangements of the present invention will accordingly be found in these two patents.

In Fig. 1 transducer 10 can be, for example, a hollow cylinder of a ceramic mixture of 96 percent barium titanate and 4 percent lead titanate, having, for example, an external diameter of two inches and an internal diameter of one and one-half inches. It is polarized substantially as described for the transducer of Fig. 1 of the above-mentioned Patent 2,573,168, granted October 30, 1951, to R. F. Wick and applicant jointly. As taught in my joint patent, such a transducer vibrates longitudinally and will therefore, obviously, subject a test sample such as element 18 of Fig. 1, when attached to one of its ends as shown in Fig. 1, to dynamic, longitudinally-directed, vibrational stress.

Transducer 10 has a conductive electrode plating 14 which covers its inner cylindrical surface and its annular end surfaces. Transducer 10 also has two external conductive electrode platings 12 and 16. Electrode 12 covers a major portion of the external cylindrical surface of transducer 10 and electrode 16 covers a narrow annular portion only of the external cylindrical surface of transducer 10 at the right end thereof, as shown. Transducer 10 is driven at a frequency of substantially 18,000 cycles per second by oscillator 26, the output of which is first amplified in amplifier 24 and then applied to electrodes 12 and 14 as shown. A nominal frequency of 18,000 cycles per second was selected since it is above the threshold of hearing, so that the annoyance of audible vibrations during testing is eliminated. As discussed in applicant's above-mentioned book, the quality factor Q is substantially independent of frequency.

As will presently become apparent, the oscillator 26 should be capable of being readily adjusted in frequency over $\pm 1,000$ cycles per second from the nominal or median frequency of 18,000 cycles per second.

As will also presently become apparent, the gain of amplifier 24 should be capable of being readily adjusted in gain over a range of 60 decibels since it is desirable to go from very small strains to very large strains.

Voltmeter 22 is connected as shown in Fig. 1 between electrodes 14 (right end of transducer) and 16 and affords an indication which is proportional to the stress in all other portions of the mechanical system being driven by the transducer 10.

Member 18 is a rod or horn preferably of circular cross-sectional area. Member 18 is made from a material to be tested and is tapered from a diameter at its left end substantially equal to the outer diameter of transducer 10 to a diameter at its right end of substantially one-tenth that of its right end. An exponential taper is used to facilitate mathematical analysis of the system.

Other cross-sectional shapes and other tapers may, however, be found substantially as effective for practical use, as is explained in applicant's above-mentioned joint patent and in applicant's above-mentioned related Patent 2,514,080 granted July 4, 1950. As taught in my above-mentioned Patent 2,514,080, at column 4, line 43 through line 63, inclusive, "By use of the tapered rod, large vibrational energies are concentrated in a small cross-sectional area, thereby generating particle velocities which approach the velocity of sound in air, since the maximum particle velocities and also the stresses sustained in the vibrating member vary inversely with the square root of its cross-sectional area. Thus, if the small end of the bar has an area one one-hundredth of the area of the large end, it will have a vibrating particle velocity ten times as great. Likewise, the small end of the vibrating rod will sustain (in the vicinity of the point of maximum strain as shown for example by curve 28 of Fig. 2 of the present application) ten times as great a vibrational stress as the large end and the face of the piezoelectric element contiguous thereto. However, since the metals have breaking strengths equal to from ten to thirty times that of piezoelectric crystals, this stress will be withstood without fracture by the tapered transformer member, thereby enabling particle velocities to be generated which are from ten to thirty times as great as those generated with conventional crystal systems." In view of this, the tapered rod or horn member is commonly referred to as a mechanical transformer, since it transforms the mechanical stress and velocity over a relatively large area at the crystal transducer into a substantially greater stress and velocity over a relatively much smaller area at (or near) the small end of the member.

Horn 18 is, preferably, firmly fastened to transducer 10 by soldering it to the annular portion of inner electrode 14 covering the right end of the transducer. Alternatively, it may be glued to the transducer by a strongly adhesive layer of cement of minimum practicable thickness.

The material of the horn 18 should be of reasonably large quality factor Q since a low quality factor material will tend to attenuate the longitudinal vibratory energy from transducer 10 to such an extent that no conveniently measurable amount of it may reach the smaller end of the horn (at the right in Fig. 1). The testing of specimens having a low quality factor Q, in accordance with the precepts of the present invention, requires a modified arrangement, an illustrative example, being shown in Fig. 3 which is described in detail hereinafter.

The members 20 in Fig. 1 represent resilient holding means, partially surrounding transducer 10, for supporting transducer 10 for longitudinal vibration about the transverse vertical plane through the center of the transducer. Similar supporting means completely encircling the transducer is illustrated in Fig. 1 of my above-mentioned joint Patent 2,573,168.

A conveniently calibrated scale 17 and a microscope 19 are provided adjacent the small end of the test horn 18 as shown in Fig. 1 so that the longitudinal motion of the small end can be readily determined with accuracy.

In Fig. 2 the distributions of dynamic, longitudinally-directed, vibratory strain and displacement from point to point along an exponentially tapered test horn of brass, at 18,000 cycles per second, with a larger to smaller end diameter ratio of ten to one, are indicated by curves 28 and 29, respectively. The horn was one-half wavelength long at its resonant frequency of 18,000 cycles per second. The node of displacement (curve 29), representing the point of zero displacement (i.e. the nodal point does not move longitudinally in response to the longitudinally-directed vibratory energy), occurs at 29 percent of the length of the horn from its larger end while the point of maximum strain (curve 28) occurs at 71 percent of the length of the horn from its larger end. However, it should be noted that the strain curve 28 is relatively flat for a distance of more than ±10 percent of the rod length about its maximum as shown in Fig. 2. For a brass bar of uniform cross-sectional area one-half wavelength long these curves would, of course, be of sinusoidal shape and the degrees of departure from sinusoidal shape are of course dependent upon the degree and type of taper employed. In accordance with well known principles of physics, for longitudinal tension and compression, strain is the change in length per unit length and hence it is a dimensionless ratio. For example, a strain of $10^{-2}$ at a specific point along an object means that at that point the length changes by one percent under the stress causing the strain. Stress is, of course, the force per unit area and is related to the strain by the factor known as Young's modulus, commonly designated $Y_0$. Young's modulus has been evaluated for substantially all materials employed in mechanical structures and is a constant within the elastic limit of the material. In view of the above, it is obvious that the stress from point to point along the member 18 of Fig. 1, for example, will vary (within the elastic limit of the material) in the same manner as the strain and vice versa. The "displacement" illustrated by curve 29 of Fig. 2 is the total amount of longitudinally-directed vibratory motion occurring at each respective point along the horn element (18 of Fig. 1, for example) as a result of the applied stress so long as the stress is under the elastic limit of the material.

In accordance with a procedure, long well known to those skilled in the art, the quality factor Q of a resonant system can be obtained by first decreasing the frequency from the value for resonance until the output from the system (indicated in the system of Fig. 1 either by reading meter 22 or noting the mechanical displacement at the small end of the rod) has decreased by three decibels, then increasing the frequency above its resonant frequency until the output from the system has again decreased by three decibels. Then the frequency of resonance is divided by the frequency interval $\Delta f$, between the lower and higher frequencies at which three decibel decreases were observed, as above described, to obtain the quality factor Q.

A modification of the above-described technique, affording a somewhat more accurate value of the quality factor Q in instances where the characteristics of the system under consideration are not substantially linear is to first increase the drive on the system at resonance by three decibels and then determine the lower and higher frequencies on each side of the resonant frequency at which a diminution of three decibels, with respect to the increased level at resonance, occurs. The frequency interval $\Delta f$ between these frequencies is then employed to divide the resonant frequency to obtain the quality factor Q. The accuracy is somewhat improved by this method for nonlinear systems since the measurements from which $\Delta f$ is determined are made at the same energy level as that initially obtaining for the resonant frequency.

It should be particularly noted that, for the arrangements of the present invention, as illustrated in Figs. 1 and 3 of the accompanying drawings, for example, so long as the quality factor Q of the specific material being tested remains substantially constant, the motion of the small end of the horn should increase in proportion to the strength of the drive, or energy, applied to the large end of the horn.

A representative value of the quality factor Q for brass (without an attached transducer) at moderate values of dynamic strain is, by way of example, 6,000. At substantially the other extreme for metals, it is found that commercial lead under moderate values of dynamic strain will have a quality factor Q of less than a twentieth of the value mentioned above for brass.

As indicated hereinabove, and as will be discussed in further detail hereinafter, the amplitude of the dynamic strain at which the material under test begins to undergo a rapid decrease in its quality factor Q, can be employed as a criterion of the minimum dynamic strain amplitude at which fatigue effects under high dynamic strain are likely to be encountered and, obviously, a criterion also by which the maximum dynamic strain amplitude to which the material should be subjected if fatigue effects are to be avoided, can be determined. Since, when the quality factor Q begins to decrease rapidly, there will also be an accompanying sharp decrease in the amplitude or magnitude of the displacement of the right end of the test horn or rod 18 of Fig. 1, it is merely necessary to observe that point at which an increased intensity of drive (increase of input to transducer 10 as indicated by increased indication of voltmeter 22) results in a sharp decrease in the displacement of the right end of the test piece 18, to determine the dynamic strain at which fatigue effects are likely to begin to be encountered when using the material being tested under dynamic strain.

The actual stress for any particular set of operating conditions can, of course, be determined as stated at lines 52 through 59, inclusive, of column 6 of applicant's above-mentioned Patent 2,514,080.

As pointed out hereinabove, for materials having a relatively low quality factor Q, it may not be feasible to employ the arrangement illustrated in Fig. 1 since attenuation along the test horn or rod 18 may be sufficiently large to prevent obtaining any conveniently measurable values of displacement at the right end of the horn.

The principles of the present invention can, however, still be applied to the measuring of the characteristics of materials having a low quality factor Q by a modified procedure and arrangement of apparatus as illustrated, for example, in Figs. 3 and 4 which will next be described.

In Fig. 3, transducer 10, oscillator 26, amplifier 24, voltmeter 22, scale 17 and microscope 19 are all identical, respectively, with the like designated portions of the system shown in Fig. 1 and described in detail above for that figure.

In Fig. 3, however, the horn or rod 30, 32 is made a full wavelength long instead of only a half wavelength and is of two-piece construction, the first and second sections thereof, 30 and 32, respectively, being held tightly together by a threaded stub member 34 of section 32 which engages a suitably threaded hole at the right end of section 30, as shown. Sections 30 and 32 are each made one-half wavelength of the frequency of the vibratory energy to which they are being subjected so that the junction between them is substantially at a point of zero strain, as illustrated by curve 28 of Fig. 2 discussed hereinabove.

The jointed full wavelength horn 30, 32, of Fig. 3 is more convenient for the purposes of the present invention since the second section 32 may be readily removed and replaced by a similar section of some different material, or combination of materials, which it is desired to test, without the necessity of breaking the joint between member 30 and transducer 10.

The arrangement just described is, of course, closely related to that illustrated in Fig. 2 of applicant's above-mentioned Patent 2,514,080.

A specific advantageous use of the arrangement illustrated in Fig. 3 will be described in conjunction with the use of an alternate terminal or right-hand half wavelength section of the overall horn of Fig. 3 such as that illustrated in Fig. 4.

In Fig. 4 an alternate terminal half wavelength section for the horn of Fig. 3 is illustrated and comprises a tapered rod having three portions 42, 46 and 48. Portion 42 is provided with a threaded stub 44, as shown, so that the assembly of which it is a portion may readily be substituted for section 32 in the arrangement of Fig. 3. In the horn section of Fig. 4, portions 42 and 48 are of brass as for sections 30 and 32 of the horn of Fig. 3. Portion 46, however, is of lead, or some other material to be tested, having a low quality factor Q such that a complete horn section of the material would have an objectionably large loss for the transmission of longitudinal vibratory energy, as mentioned hereinabove.

Assuming portion 46 to be of lead, it is firmly soldered to each of its associated brass portions 42 and 48, as shown. The combined maximum length of portions 46 and 48 should be somewhat less than one-eighth wavelength at the testing frequency for longitudinal vibrational waves traveling along these portions. Portion 42 is tapered as for the corresponding portion of section 32 of Fig. 3. To simplify stress calculations, portions 46 and 48 are preferably made of uniform diameter throughout their respective lengths equal to the diameter of the right end of portion 42. The length of portion 48 is adjusted so that the overall terminal section illustrated in Fig. 4 is precisely one-half wavelength, neglecting stub 44, from the left end of portion 42 to the right end of portion 48, as measured at the testing frequency, for the transmission of longitudinal vibratory energy through the portions 42, 46 and 48. Final adjustment in length is conveniently effected by substituting the section of Fig. 4 for section 32 of Fig. 3 and adjusting the length of brass portion 48 for maximum displacement when driven by longitudinal energy from transducer 10 via section 30 at the testing frequency (assumed, for example, as substantially 18,000 cycles per second).

The quality factor Q is determined for the system of Fig. 3 (all brass horn) and for the system of Fig. 3 with the sections 42, 46, 48 of Fig. 4 replacing section 32 in Fig. 3, by one of the methods described in detail above (involving the determination of the frequency interval $\Delta f$). In Fig. 5 curves 54 and 58 are representative of the variation of the quality factor Q with dynamic strain amplitude at the point of maximum strain for the all-brass horn and the brass horn with a small lead sample included, respectively. For both of these curves the combined horn and transducer effects are included.

The quality factor Q of the lead specimen 46 forming part of the assembly of Fig. 4 can then be calculated in the following relatively simple manner. The final lead and brass sections are, as previously stated, preferably of constant cross section in order to facilitate calculations of strain and Q. Furthermore, the total length of the lead and terminating brass section is less than one-eighth of a wavelength and hence it is valid to use the equivalent T network for the section.

Figure 7:
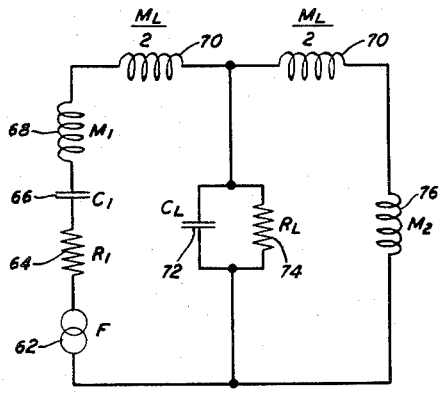
Figs. 7, 8 and 9 are equivalent electrical schematic diagrams employed in explaining the operation of certain arrangements of the invention.

All of the loss of a mechanical structure is associated with the strain and hence can be lumped as a resistance $R_L$ designated 74 in parallel with the compliance $C_L$ designated 72 of the lead section as shown by Fig. 7, which figure also shows the equivalent circuit for the rest of the system. In Fig. 7 generator F designated 62 represents the source of driving power, i.e., the electromechanical transducer and resistance $R_1$ designated 64, capacitance $C_1$ designated 66 and inductance $M_1$ designated 68 represent the loss, compliance and mass, respectively, of the transducer and portions of the brass horns 30 and 42 to the left of specimen 46. The final brass section has very little dissipation and can be represented either as a lumped mass $M_2$ designated 76, or more exactly as the impedance $$j\, S\rho\, V \tan \frac{\omega l}{V} \quad (1)$$

where S is the area of the section, $\rho$ the density, V the sound velocity of the medium, $\omega$ the frequency multiplied by $2\pi$, and $l$ the length of the section. If, as will usually be the case, the length $l$ is small enough, we can replace the tangent by its argument giving $$M_2 = \frac{S\rho V \omega l}{\omega V} = \rho S l \quad (2)$$

To evaluate the quality factor Q of the lead from the measurement we have to evaluate the impedance looking back into the metal horn at the joining point between sections 42 and 46 of Fig. 4. For our purpose, we need a representation given by two terms in the Taylor series of the reactance as a function of frequency and we need the resistance at this frequency. The simplest way to get this result is to make two measurements as follows.

(1) Replace the composite section of brass horn which includes the lead sample, as illustrated in Fig. 4, by a complete brass horn section, such as 32 of Fig. 3, tuned to the same frequency as the composite section.

(2) Determine the change in resonance frequency due to the addition of a small known mass on the end of the brass horn (this mass can conveniently be a small piece of lead soldered to the end of the horn section 32 of Fig. 3).

Then the reactance to the left of the joining point in each case is equal to the negative of that to the right since the system is in resonance. From the transmission line equations $$F_2 = F_1 \cos \frac{\omega l}{V} - jZ_0 \dot{x}_1 \sin \frac{\omega l}{V} \quad (3)$$

$$\dot{x}_2 = \dot{x}_1 \cos \frac{\omega l}{V} - jF_1 \sin \frac{\omega l}{V} \quad (4)$$

where $Z_0 = S\rho V$ is the characteristic impedance of the rod, $F_1$ and $F_2$ are the respective mechanical input and output forces at the ends of the section and $\dot{x}_1$ and $\dot{x}_2$ are the particle velocities at the input and output ends respectively. We find on terminating the rod in an impedance $$Z_l = \frac{F_2}{\dot{x}_2} \qquad (5)$$

that the input impedance for the rod is $$Z_R = \frac{Z_l + jZ_0 \tan \frac{\omega l}{V}}{1 + j\frac{Z_l}{Z_0} \tan \frac{\omega l}{V}} \qquad (6)$$

where for this case $Z_l$ is the impedance corresponding to the mass of the added lead.

Then for the two experiments without and with the added lead $$Z_{R_1} = jX_{R_1} = jZ_0 \tan \frac{\omega_1 l}{V} \qquad (7)$$

$$Z_{R_2} = jX_{R_2} = \frac{j\omega_2 M_2 + Z_0 \tan \frac{\omega_2 l}{V}}{1 - \frac{\omega_2 M_2}{Z_0} \tan \frac{\omega_2 l}{V}} \qquad (8)$$

The input impedances of the rod without the lead $Z_{R_1}$ and with the lead $Z_{R_2}$, respectively, are reactive and hence in Equations 7 through 10, inclusive, are represented as $X_{R_1}$ and $X_{R_2}$, respectively, to conform with the usual symbolism of conventional transmisison line analysis. The reactance to the left of the joining point of the mass of lead to the brass horn can be represented near the resonance frequency by a series mass and compliance $M_1$, $C_1$ of Fig. 7 having the values $$M_1 = \frac{-f_2 X_{R_2} + f_1 X_{R_1}}{2\pi (f_1^2 - f_2^2)} \qquad (9)$$

$$C_1 = \frac{f_1^2 - f_2^2}{2\pi f_1 f_2 (-f_2 X_{R_1} + f_1 X_{R_2})} \qquad (10)$$

where $f_1$ is the resonant frequency of the horn without the lead and $f_2$ is the resonant frequency of the horn with the lead.

Figure 8:
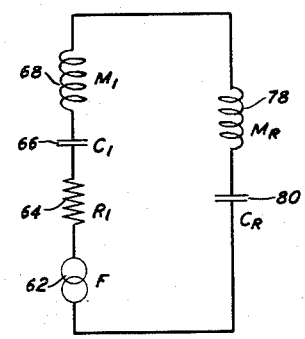

One can now determine the proper resistance to put in series with these elements by assuming, in the case of no added weight, that the loss in the system occurs solely in the portion to the left of the point under consideration. This is consistent with the fact that most of the loss is in the barium titanate driver. Then we have the representation for no terminating mass shown by Fig. 8, where, if we use the transmission line Equation 1, $$M_R = \frac{\rho S l}{2}\left[\frac{1}{\cos^2 \frac{\omega l}{V}} + \frac{\tan \frac{\omega l}{V}}{\omega l/V}\right] \qquad (11)$$

$$C_R = \frac{2}{\omega^2 \rho S l}\left[\frac{1}{\cos^2 \frac{\omega l}{V}} - \frac{\tan \frac{\omega l}{V}}{\omega l/V}\right] \qquad (12)$$

and where $M_1$, $C_1$, $R_1$ and $F$ are identical with the like designated elements of Fig. 7 and $M_R$ designated 78 and $C_R$ designated 80 are given by the above Equations 11 and 12 respectively. If $l$ is small the Equations 11 and 12 reduce to $M_R = \rho S l$; and $C_R \to \infty$, respectively. If then we measure the quality factor $Q_1$ of the brass horn combination alone $$R_1 = \frac{(M_R + M_1)}{Q_1} \qquad (13)$$

Figure 9:
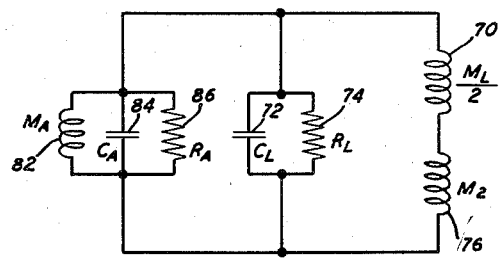

We now have enough data to calculate the quality factor $Q_L$ of the lead sample. The equivalent circuit is that shown in Fig. 7. It is convenient to join ($\frac{1}{2}$) $M_L$ to $M_1$, where $M_L$ is the mass of the added lead. In order to match the form of the termination it is convenient to represent the series impedance $$C_1, R_1, M_1 + \frac{1}{2}M_2$$

by a parallel combination of elements $M_A$, $C_A$, and $R_A$ as shown by Fig. 9. This representation will hold only for the resonant frequency $\omega_R = 2\pi f_R$. The element values for the parallel combination, comprising $M_A$ designated 82, $C_A$ designated 84 and $R_A$ designated 86, respectively, in Fig. 9, are given by the Equations $$M_A = M_1'\left(1 - \frac{1}{\omega_R^2 M_1' C_1}\right)^2 \qquad (14)$$

$$C_A = C_1/(\omega_R^2 M_1' C_1 - 1)^2 \qquad (15)$$

$$R_A = \frac{(\omega_R^2 M_1' C_1 - 1)}{\omega_R^2 C_1^2 R_1} \qquad (16)$$

where $$M_1' = M_1 + \frac{1}{2}M_L \qquad (17)$$

We can then add the compliances and combine the masses and resistances in parallel obtaining the elements for an equivalent circuit having only three arms connected in parallel, the respective arms being $$M_B = \frac{M_A\left(\frac{M_L}{2} + M_2\right)}{M_A\left(\frac{M_L}{2} + M_2\right)} \qquad (18)$$

$$C_B = C_A + C_L \qquad (19)$$

$$R_B = \frac{R_A R_L}{R_A + R_L} \qquad (20)$$

Since this is a resonant condition, the reactance of $M_B$ equals the reactance of $C_B$ and the quality factor $Q_C$ of the combination, i.e., of a composite horn such as that illustrated in Fig. 4, is given by $$Q_C = \left(\frac{R_A R_L}{R_A + R_L}\right)\omega_R(C_A + C_L) \qquad (21)$$

Since quality factor $Q_A = R_A \omega_R C_A$ and quality factor $Q_L = R_L \omega_R C_L$, we have on solving for quality factor $Q_L$, that is the quality factor Q of the lead sample $$Q_L = \frac{1}{\frac{C_A + C_L}{C_L Q_C} - \frac{C_A}{C_L Q_A}} \qquad (22)$$

For the particular case predicated above, using the values for the sample; for the brass; $V = 3.5 \times 10^5$ cm./sec.; $\rho = 8.4$ grams/cc.; $S =$ area of horn $= 0.0127$ sq. cm.; for the lead; $\rho = 11.3$ grams/cc.; Young's modulus $Y_0 = 1.5 \times 10^{11}$ dynes/cm.$^2$; $S =$ area of lead $= 0.0182$ sq. cm., $l_1 =$ length of lead sample $= 0.30$ cm.; $l =$ length of added brass horn $= 1.60$ cm., resonance frequency $f_R = 17,300$ cycles per second. For the determination of $M_1$, $R_1$ and $C_1$ we have added mass $= 0.14$ gram; length of brass horn to give 17,300 cycles $= 2.22$ cm., decrease in frequency due to the added mass was 620 cycles. The quality factor $Q_A$ is illustrated by the curve 54 of Fig. 5 and is about 1900 for all the strains used in measuring the lead. The quality factor $Q_C$ is illustrated by the curve 58 of Fig. 5. Hence the formula for the quality factor $Q_L$ of lead, eliminating other possible contributing factors such as the driving transducer, is $$Q_L = \frac{1}{\frac{15.4}{Q_C} - .00765} \qquad (23)$$

A plot of the resulting quality factor $Q_L$ is illustrated by curve 59 of Fig. 5 and to a larger scale by curve 60 of Fig. 6 as a function of strain amplitude. The initial value of the quality factor Q for small dynamic strains measured this way is consistent with that obtained by direct measurement by prior art methods. For example, values of the quality factor Q, at room temperature, varying from 125 to 250, depending on the purity of the lead, have been obtained by prior art methods. The sample measured, as described in detail above, was of commercial lead with a considerable quota of impurities.

It is generally desirable to relate the quality factor Q to the strain occurring in the lead section since strain is the fundamental variable causing the nonlinear response in metals. A simple approximate method is to measure the displacement of the middle of the lead section for a given pickup voltage by means of a microscope focused on a bright spot on the lead. This is drawn out so as to appear as a line by the motion. The end section can then be regarded as a mass $M_L/2+M_2=(13.71\ S_0\ \text{grams})$. The stress on the middle section will then be $$T_{11} = S_0\omega^2(M_L/2+M_2)\xi = (2\pi \times 17{,}300)^2(13.71)\xi \quad (24)$$

where $\xi$ is the displacement measured by relating the displacement measured by the microscope to the pickup voltage. For a pickup voltage of 1.0 volts, the measured displacement was 0.2 mil inch or 0.0005 centimeter. Hence the maximum stress exerted on the section was $$T_{11} = 8.05 \times 10^7 \text{ dynes/cm.}^2 \quad (25)$$

To obtain the strain we divide this by the value of Young's modulus which for the sample being considered is $1.6 \times 10^{11}$ dynes/cm.$^2$. Hence, the value of strain at this voltage was $5.0 \times 10^{-4}$. The ordinates of Fig. 6 show the variation of the quality factor Q versus strain for the lead sample tested.

The quality factor Q begins to decrease at a strain of about $10^{-5}$. This is close to a strain that would be calculated for the production of Frank-Read dislocation loops. The average displacement of a dislocation loop for a stress $T_{13}$ is equal to $$\bar{x} = \frac{\pi T_{13} l^2}{6\mu b} \quad (26)$$

The average displacement $x$ is equal to ⅔ of the maximum displacement, and the loop becomes unstable when it has grown to semi-circular form with $x = l/2$. Hence when this occurs, the strain $S_{13}$ is equal to $$S_{13} = \frac{T_{13}}{\mu} = \frac{2b}{\pi l} \quad (27)$$

Since the value of $b$, the displacement vector along the glide plane is $3.5 \times 10^{-8}$ centimeters for lead, the loop length will be $$l \doteq 2 \times 10^{-4} \text{ cm.} \quad (28)$$

The average value found by prior art methods for pure lead is $4 \times 10^{-4}$. Hence $2 \times 10^{-4}$ is a reasonable value for commercial lead and the data agree with the idea that the large decrease in the quantity factor Q is produced by energy lost in the production of Frank-Read dislocation loops. The temperature of the lead increases markedly in this region.

Besides the use of this system to study the quality factor Q of materials as a function of dynamic strain amplitude, the system of Figs. 3 and 4 has been used to study the breaking strength of plastics. For this purpose a plastic horn was mounted as the final section and the amplitude was increased until fracture occurred. For a steady state oscillation, the fracture invariably occurred by the plastic melting due to the large heat production at the point of maximum strain. Since this fracture is not connected with the mechanical strength of the plastic, a pulsing system was set up for which the pulse was on for one one-hundredth of a second and then was absent for several seconds. With this system fractures were obtained for strains of about $1.2 \times 10^{-2}$. This strain was quite reproducible and would serve as the basis of a fracture test for plastics, The same system was applied for several metals with the results shown in the following Table I.

Table I

| Material | Density | Vel. of Propagation, cm./sec. | Young's Modulus, dynes/cm.² | Displacement in milinches | Max. Stress, dynes/cm.² | Max. Strain |
|---|---|---|---|---|---|---|
| Plastic | 1.35 | 2.1×10⁵ | 5.9×10¹⁰ | 9.3 | 6.9×10⁸ | 1.2×10⁻² |
| Brass | 8.4 | 3.5×10⁵ | 1.04×10¹² | 4.5 | 3.5×10⁹ | 3.3×10⁻³ |
| Duraluminum | 2.7 | 5.1×10⁵ | 7.0×10¹¹ | 14.6 | 5.7×10⁹ | 8.2×10⁻³ |

The plastic has the highest limiting strain and suffers a clean fracture. The metals develop a low quality factor Q, due to the production of Frank-Read dislocation loops and sufficient energy was not available in the particular apparatus used in these experiments to produce a break. It appears that the alloys such as brass and duraluminum can endure a larger strain than pure metals.

Figure 10:
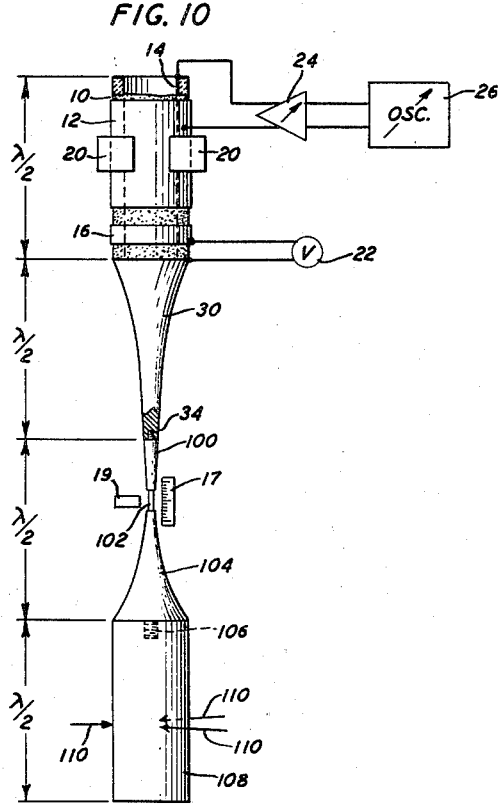
Fig. 10 illustrates a further arrangement of the invention whereby materials can be tested under combinations of simultaneously applied constant and dynamic strains.

In Fig. 10 an arrangement of the invention is shown whereby materials can conveniently be tested under the combination of a continuous or static tensile (or compressive) strain and a dynamic strain of adjustable amplitude. The practical significance of such tests is at once apparent, since many structural elements will, obviously, be subjected to combinations of simultaneously applied continuous and dynamic strains, in service, and it is therefore very important to determine the influence upon the fatigue properties of a material of such combined strains.

In more detail in Fig. 10, the transducer 10 and associated units including oscillator 26, amplifier 24, meter 22, and the initial horn section 30 and their circuits and mechanical relationships to each other are all identical with the respective correspondingly designated units shown in Fig. 3 and described in detail above. Also microscope 19 and scale 17 can be identical with those of Fig. 3.

In Fig. 10, however, the test piece, comprising portions 100, 102 and 104, is tapered to expand in both directions from the center portion 102 as shown, and an additional "loading" member 108 is included to produce a constant tensile strain upon the test piece 100, 102, 104 when the apparatus is mounted vertically with the transducer 10 uppermost, as illustrated in Fig. 10. A constant compressive strain can obviously be realized by simply inverting the arrangement of Fig. 10 so that the "loading" member 108 is uppermost, in which case guiding members indicated by the three arrows 110, spaced at intervals of 120 degrees around member 108, or an equivalent, should be provided to prevent lateral movement of member 108. Ordinarily, guiding members 110 will not be essential, where the arrangement is employed as shown in Fig. 10 with member 108 at the lower end of the overall assembly, i.e., for tests in which a constant tensile strain is desired. The test piece 100, 102, 104 and member 108 are each one-half wavelength long with respect to the frequency (for example, 18,000 cycles per second) at which tests are to be made. Alternatively, one or both of them may be any integral number of half wavelengths long.

For testing materials such as aluminum which are not readily soldered to other metals, the entire test piece including portions 100, 102 and 104 is preferably machined from a single piece of the material. Portion 102 is given a substantially reduced cross-sectional area so that the strain on this portion is correspondingly substantially increased. For example, if its diameter is made one-quarter that of the adjacent ends of portions 100 and 104, the strain will be increased in portion 102 by a factor of 16 with respect to said adjacent ends. Threaded studs 34 and 106 are preferably provided at the upper end of portion 100 and the lower end of portion 104, respectively, as shown, to facilitate making firm mechanical connections to members 30 and 108, respectively, as well as to facilitate the substitution of a test piece of a different material.

Where the material to be tested is a material, such as lead, having a relatively quite low quality factor Q, only the portion 102 of the test piece should be made of lead, the adjacent portions 100 and 108 being made of a high quality factor Q material such as brass and the lead portion 102 being then soldered to the adjacent portions.

In general, the effect of a constant tensional strain superimposed upon a dynamic strain is to lower the dynamic strain amplitudes at which the gradual and sharp decreases in the quality factor Q are first detected, the general shape of the curve remaining substantially as for the same test specimen with only the dynamic strain present. Compressional strains will in general increase the dynamic strain required to produce fatigue.

Obviously fatigue tests to the rupture of a sample of material under combinations of simultaneously applied constant and dynamic strains can readily be made with arrangements of the type illustrated in Fig. 10, in accordance with the teachings of my above-mentioned Patent 2,514,080, see particularly Fig. 2 of said patent and the pertinent portions of its text.

Numerous and varied other arrangements and testing procedures, within the scope of the principles of the present invention, will readily occur to those skilled in the art. The above-described arrangements and methods are illustrative only, and obviously do not exhaustively cover all arrangements and methods readily perceptible to those skilled in the art.

What is claimed is:

1. Apparatus for determining the dynamic strain amplitudes at which creep and fatigue effects are likely to be encountered for a material to be tested, said apparatus comprising an electromechanical transducer, the transducer including a cylinder of ceramic material having major conductive driving electrodes and an isolated conductive minor electrode adapted to provide an electrical voltage proportional to the amplitude of vibration of the cylinder, a source of alternating current energy, an electrical circuit interconnecting said source and said transducer to drive said transducer in longitudinal vibration, said circuit including means for adjusting the amplitude of the energy applied to said transducer, means comprising a voltmeter electrically connected with the minor electrode providing a voltage reading indicating the dynamic strain amplitude developed in said transducer, a mechanical transformer for longitudinal vibratory energy comprising an elongated tapered member of the material to be tested, said member having its larger end rigidly attached to an end of said transducer, and means comprising a scale and a microscope adjacent the smaller end of said elongated tapered member for measuring the physical displacement of the smaller end of said tapered member under the dynamic strain imparted to said member, whereby the dynamic strain amplitudes at which physical displacement of the end of said elongated tapered member decreases slowly and at which it decreases sharply with a small increase in dynamic strain amplitude can be determined, respectively, thus indicating the minimum dynamic strain amplitudes at which creep and fatigue effects, respectively, are likely to be encountered with the test material.

2. The apparatus of claim 1, the test sample comprising a portion only of said elongated tapered member, said portion being substantially 3/32 wavelength long and extending substantially between 1/32 and 1/8 wavelength of the frequency of the source of energy as measured from the smaller end of said tapered member, whereby materials having a low quality factor Q can be measured to determine the minimum dynamic strain amplitudes at which creep and fatigue effects, respectively, are likely to be encountered with said test material.

3. The apparatus of claim 1 and means for simultaneously applying a constant strain to said material in a direction parallel to the direction of the dynamic strain.

4. The apparatus of claim 3 in which said constant strain is a tensile strain.

5. The apparatus of claim 3 in which said constant strain is a compressive strain.

References Cited in the file of this patent

UNITED STATES PATENTS

| | | |
|---|---|---|
| 1,583,877 | Hahnemann et al. | May 11, 1926 |
| 2,316,253 | Keinath | Apr. 13, 1943 |
| 2,373,351 | Sims | Apr. 10, 1945 |
| 2,514,080 | Mason | July 4, 1950 |
| 2,573,168 | Mason et al. | Oct. 30, 1951 |
| 2,641,128 | Black | June 9, 1953 |

OTHER REFERENCES

Pages 55–56, Freberg-Kemler, "Elements of Mechanical Vibration," published by Wiley and Sons (1943), New York, N.Y.

Pages 309–312, Murray, "Fatigue and Fracture of Metals," published by Wiley and Sons (1952), New York, N.Y.

Pages 40–43, Cazaud, "Fatigue of Metals," published by Philosophical Library (1953), New York, N.Y.

Pages 85–86, Cazaud, "Fatigue of Metals," published by Philosophical Library (1953), New York, N.Y.